Patented Nov. 21, 1950

2,530,831

UNITED STATES PATENT OFFICE 2,530,831

ALKYLENE-BRIDGED 5,6-DIHYDROXY-QUINOLINES

William A. Lott, Maplewood, N. J., assignor to E. R. Squibb & Sons, New York, N. Y., a corporation of New York No Drawing. Application April 17, 1948, Serial No. 21,739

6 Claims. (Cl. 260—286)

1

This invention relates to, and has for its object the provision of, certain alkylene-bridged 5,6-dihydroxy-quinolines. The final compounds of this invention are valuable therapeutic agents, some being anti-malarial chemotherapeutic agents.

The alkylene-bridged 5,6-dihydroxy-quinolines of this invention are comprised by the following main general formula

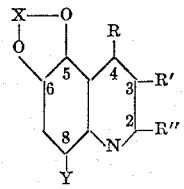

wherein X represents the divalent residue of an aliphatic aldehyde or aliphatic glycol, Y represents a member of the group consisting of nitro, amino and substituted-amino, and R, R' and R'' each represents a member of the group consisting of hydrogen, lower alkyl, and phenyl.

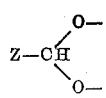

or the glycol-derived group

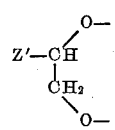

wherein Z and Z' each represents a member of the group consisting of hydrogen, lower alkyl, and alkylamino-(divalent lower alkyl); and in which R, R' and R'' are each a member of the group consisting of hydrogen, lower alkyl, and phenyl.

The alkylene-bridged, 5,6-dihydroxy-quinolines of this invention are obtainable from known compounds by the general method illustrated by the following course of reactions for the preparation of a representative compound of this invention:

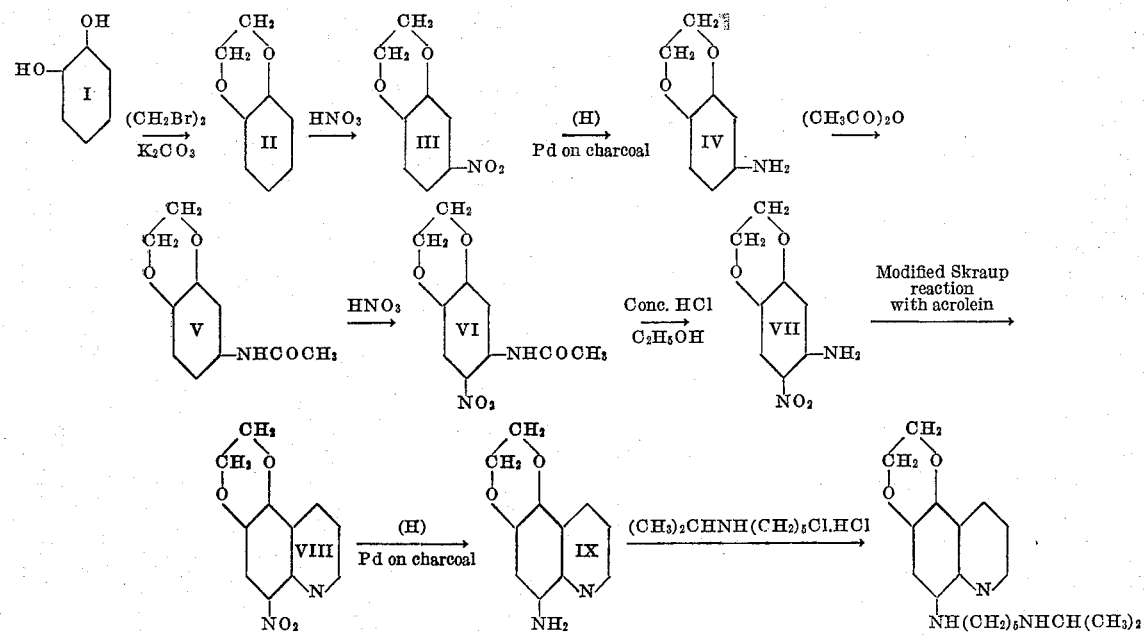

of hydrogen and non-functional substituents (e. g., halo, lower alkyl, and aryl).

The preferred compounds of this invention are those in which

in the foregoing general formula is the aldehyde-derived group

The 8-nitro-5,6-(alkylene-bridged dihydroxy)-quinoline (VIII) and substitution products thereof may be obtained from the 5-nitro-4-amino-1,2-(alkylene-bridged dihydroxy)-benzene (VII) by the Skraup reaction, e. g., by heating a mixture of VII, glycerol, concentrated sulfuric acid and nitrobenzene; preferably, however, it is obtained by the modified Skraup reaction A or B, described hereinafter.

Modified Skraup reaction A essentially comprises reacting VII, in the presence of a dehydrating agent and an oxidizing agent, with a member of the group consisting of acrolein, acroleins having a non-functional substituent in the α-position, β-(lower alkyl)-oxy-propionaldehydes, β-(lower alkyl)-oxy-propionaldehydes having a non-functional substituent in the α-position, and di-(lower alkyl)-ethers and di-(lower fatty acid)-esters of the theoretical diols corresponding to each of these aldehydes. Modified Skraup reaction B essentially comprises reacting VII with a member of this "acrolein group," in the presence of a concentrated phosphoric acid and of an oxidizing agent.

The amino group in the amino-quinoline may be substituted by a variety of groups, and substitution may be effected in the conventional manner. Preferably, however, the amino group is substituted by an alkylamino-alkyl group; and preferably also, the substitution is effected by heating the reactants (the amino-quinoline and an alkylamino-alkyl halide) in toluene in the presence of sodamide. Among the utilizable alkylamino-alkyl halide reactants are: 3-diethylamino-propyl chloride; 5-isopropylamino-amyl chloride hydrochloride; 4-isopropylamino-1-methyl-butyl bromide hydrobromide; 4-diethylamino-1-methyl-butyl bromide hydrobromide; 6-isopropylamino-hexyl bromide hydrobromide; and 5-isopropylamino-1-methyl-amyl bromide hydrobromide.

The following examples are illustrative of the invention:

Example 1

(a) Catechol is reacted with methylene bromide and sodium hydroxide as described in J. Gen. Chem. (U. S. S. R.) 8, 975 (1938) [Chem. Abs., 33, 3777 (1939)] to obtain 1,2-methylenedioxy-benzene.

(b) 1,2-methylenedioxy-benzene is nitrated as described in J. Chem. Soc. 95, 1979 (1909) to obtain 4-nitro-1,2-methylenedioxy-benzene.

(c) A mixture of 16.7 g. (0.1 mol) 4-nitro-1,2-methylenedioxy-benzene, 0.3 g. 5% Pd on charcoal, and 150 ml. absolute ethanol is shaken at room temperature under 50 lbs. (i. e., per sq. in.) of hydrogen. After reduction is complete (about 20 minutes), the reduction products of five of such runs are combined and filtered free of catalyst; and the alcohol is removed by evaporation under reduced pressure. The oily residue is treated with 150 ml. acetic anhydride, and the reaction mixture is heated on the steam bath for one hour and then cooled. The crystalline 4-acetamido-1,2-methylenedioxy-benzene which separates is filtered off and washed with water. The product weighs about 60 g. (about 67% yield), and melts at 135–6° C.

(d) 4-acetamido-1,2-methylenedioxy-benzene is nitrated as described in J. Chem. Soc. 111, 903 (1917) to obtain 5-nitro-4-acetamido-1,2-methylenedioxy-benzene.

(e) A mixture of 121 g. 5-nitro-4-acetamido-1,2-methylenedioxy-benzene, 363 ml. absolute alcohol, and 726 ml. concentrated hydrochloric acid is refluxed and stirred for a half hour, and then poured into a liter of water. The resulting solution is made alkaline with concentrated aqueous ammonia, and the precipitated solid (5-nitro-4-amino-1,2-methylenedioxy-benzene) is filtered off, washed with water, and air-dried. The product weighs about 98 g. (an almost quantitative yield), and melts at 194–5° C.

(f) A mixture is formed of 18.2 g. 5-nitro-4-amino-1,2-methylenedioxy-benzene, 28.4 g. arsenic acid, and 100 ml. 85% phosphoric acid; the mixture is heated to 60–70° C.; and 9.5 ml. acrolein is added dropwise with stirring over a period of ¾ hour, while maintaining the temperature at 60–70° C. After it has been stirred for an additional half hour at 60–70° C., the reaction mixture is poured into 500 ml. water, and filtered; and the filtrate is made alkaline with aqueous ammonia. The precipitate formed (5,6-methylenedioxy-8-nitro-quinoline) is collected by filtration and dried; the dry solid is dissolved in 500 ml. ethyl acetate; and the solution is concentrated to about 100 ml. The product crystallizing out melts at 191–2° C.; yield 11 g. (50%). Its analysis (C, 54.97%; H, 2.69%; and N, 13.08%) is in good agreement with that calculated for $C_{10}H_8N_2O_4$.

(g) A suspension of 10.9 g. (0.05 mol) 5,6-methylenedioxy-8-nitro-quinoline and 10 g. of 5% Pd on charcoal in 130 ml. ethyl acetate is hydrogenated at room temperature and 50 lbs. hydrogen. The product, 5,6-methylenedioxy-8-amino-quinoline, isolated by filtering off the catalyst and concentrating the filtrate, weighs about 6.0 g. (about 63% yield), and melts at 116–117° C. Its analysis (C, 63.56%; H, 4.25%; and N, 14.86%) is in good agreement with that calculated for $C_{10}H_8O_2N_2$.

(h) 4 g. sodamide wet with toluene is added to a solution of 15 g. (0.08 mole) 5,6-methylenedioxy-8-aminoquinoline, 12.4 g. (0.083 mole) 3-diethylamino-propyl chloride and 75 ml. distilled toluene. The mixture is heated in an oil bath to 70° C., and kept at this temperature for a half hour, during which time there is a constant evolution of ammonia; and the bath temperature is then raised to 115° C. over a period of a half hour, and maintained at this temperature for five hours, when the evolution of ammonia has ceased. After cooling to room temperature, 8 g. of unreacted starting material crystallizes out, and is recovered by filtration. The toluene solution is washed with water, and then extracted four times with 75 ml. portions of 5% acetic acid; the (combined) acid extract is washed with three 25 ml. portions of ether, and then made alkaline with sodium hydroxide; and the free oily base is extracted with three 100 ml. portions of ether. The (combined) ether extract is washed with water, and dried over anhydrous potassium carbonate; the ether is evaporated, and the residue fractionated. The fraction boiling at 198–200° C/1.4 mm., (about 5.0 g.; an about 20% yield) is collected. Allowing for the recovered starting material, the yield of the product, 5,6-methylenedioxy-8-(3-diethylamino-propylamino)-quinoline is about 44%. Its analysis (C, 67.33%; H, 7.62%; and N, 14.27%), is in good agreement with that calculated for $C_{17}H_{23}N_3O_2$.

5 g. (0.0166 mole) of the free base thus obtained is dissolved in 30 ml. 4% acetic acid, and treated with a solution of 3 g. KI in 10 ml. water. The mono-hydriodide separates cleanly, and on recrystallization from alcohol-ether is obtained as a bright yellow crystalline solid, melting at 154–5° C. (yield about 6 g.; an about 84.3% yield). Its analysis (C, 47.68%; H, 5.54%; and N, 9.86%) is in good agreement with that calculated for $C_{17}H_{23}N_3O_2 \cdot HI$.

The di-hydriodide is prepared by dissolving the base in anhydrous ether, and adding a slight excess (5%) over the calculated amount of 57% HI. The product, after several recrystallizations from alcohol, melts at 158–9° C. Other monoand di-(acid-addition salts) may be prepared from the free base by conventional means.

*Example 2*

(a) Catechol is reacted with ethylene dibromide and potassium carbonate as described in J. Chem. Soc., 107, 1588 (1915) to obtain 1,4-benzodioxane.

(b) 1,4-benzodioxane is nitrated as described in Ann. 280, 206 (1894) to obtain 4-nitro-1,2-ethylenedioxy-benzene.

(c) 4-nitro-1,2-ethylenedioxy-benzene is converted into 4-acetamido-1,2-ethylenedioxy-benzene as described in section c of Example 1 for the preparation of the corresponding methylenedioxy compound.

(d) 42 g. (0.22 mol) 4-acetamido-1,2-ethylenedioxy-benzene is dissolved in a liter of acetic acid, and 22 ml. concentrated nitric acid in 70 ml. acetic acid is added at room temperature, while stirring, over a period of 20 minutes. The mixture (containing the product which has crystallized out) is stirred for an hour, and a liter of water is added; and the product is filtered off and washed with water. The product, 5-nitro-4-acetamido-1,2-ethylenedioxy-benzene, obtained in about 92% yield, melts at 179° C.; and its analysis (C, 50.26%; H, 4.38%; and N, 11.78%) is in good agreement with that calculated for $C_{10}H_{10}O_5N_2$.

(e) Into a beaker set in an oil bath and equipped with a mechanical stirrer and two long-stemmed separatory funnels which extend to the bottom of the beaker, is placed a mixture of 12 g. (0.055 mole) 5-nitro-4-acetamido-1,2-ethylenedioxy-benzene, 7 g. (0.031 mole) of $As_2O_5$ and 40 ml. of high-test glycerol. One funnel contains 15 ml. concentrated sulfuric acid, and the other 150 ml. ice water. The oil bath is heated to 150° C. while the mixture is stirred vigorously; the flame is removed; and all the sulfuric acid is added below the surface of the mixture. An immediate exothermic reaction occurs, and is allowed to continue for exactly 60 seconds; the oil bath is removed; and the water is added all at once below the surface of the reaction mixture. The reaction mixture is then filtered to remove any unreacted starting material, and the filtrate made strongly alkaline with 200 ml. of 20% sodium hydroxide. The resulting precipitate is filtered off [filtrate X being set aside]; and the precipitate is washed with water, and redissolved in 40 ml. 5% hydrochloric acid. The acid solution is made alkaline with 11 ml. concentrated aqueous ammonia, and the solid formed is filtered off and dried. After crystallization from acetone there is obtained about 5 g. (an about 42% yield) 5,6-ethylenedioxy-8-nitro-quinoline, melting at 158–9° C. Its analysis (C, 56.93%; H, 3.63%; and N, 12.18%) is in good agreement with that calculated for $C_{11}H_8N_2O_4$.

The alkaline filtrate X, on adjustment to pH 4, yields about 4 g. of a crude new by-product (5,6-dihydroxy-8-nitro-quinoline). On recrystallization from boiling water, the product is obtained as purple needles melting above 300° C. Its analysis (C, 52.95%; H, 3.24%; and N, 13.66%) is in good agreement with that calculated for $C_9H_6N_2O_4$. The product (a base) may be converted into acid-addition salts (e. g., the hydrochloride) by conventional means. It is potentially useful for the preparation of therapeutic agents for schistosomiasis.

[When prepared by the "acrolein" method described for the corresponding methylenedioxy derivative in section f of Example 1, the 5,6-ethylenedioxy-8-nitro-quinoline is obtained in a yield of about 53%.]

(f) A suspension of 14.7 g. 5,6-ethylenedioxy-8-nitro-quinoline, 100 ml. ethyl acetate and 2.5 g. 5% Pd on charcoal is reduced catalytically at room temperature and 45 lbs. of hydrogen. The catalyst is filtered off, and the solvent is removed by evaporation in vacuo. The product (5,6-ethylenedioxy-8-amino-quinoline), on recrystallization from 75 ml. of 95% ethanol, melts at 73–4° C. (yield about 8.5 g.; about 66%). Its analysis (C, 65.48%; H, 4.77%; and N, 14.03%) is in good agreement with that calculated for $C_{11}H_{10}N_2O_2$. [Alternatively, after removal of the catalyst, ether and ethereal hydrogen chloride are added to the filtrate; the precipitated hydrochloride of 5,6-ethylenedioxy-8-amino-quinoline is filtered off and dissolved in water; and the free amine is precipitated by addition of alkali.]

(g) A mixture of 23.5 g. (0.165 mol) 5,6-ethylene-dioxy-8-amino-quinoline, 16.8 g. (0.084 mol) 5-isopropylaminoamyl chloride hydrochloride, and 21 ml. water is heated at 80° C. for 20 hours and at 100° C. for 4 hours; the reaction mixture is cooled, diluted with 50 ml. water which has been heated to 50° C., and adjusted to pH 5.0; and at 50° C., the resulting mixture is extracted with three 100 ml. portions of benzene. The remaining aqueous layer, on cooling, deposits 5,6-ethylenedioxy-8-(5'-isopropylamino-amyl-amino)-quinoline monohydrochloride, which, on recrystallization from hot water, melts at 125–6° C. (yield about 24.3 g.; about 79.0%). Its analysis (N, 11.29%; and Cl, 9.85%) is in good agreement with that calculated for $C_{19}H_{28}N_3O_2Cl$.

The monohydrochloride, on conversion into the monophosphate as described in J. A. C. S. 68, 1529 (1946), yields about 23.5 g. (about 65.4%) of a bright-yellow crystalline product melting at 216–8° C. Its analysis (N, 9.60%; and P, 7.20%) is in good agreement with that calculated for $C_{19}H_{30}N_3O_6P$.

*Example 3*

A mixture of 19.6 g. 5-nitro-4-amino-1,2-ethylenedioxy-benzene [obtained from the 5-nitro-4-acetamido-1,2-ethylenedioxy benzene described in section d of Example 2 by the hydrolysis described in section e of Example 1], 13.2 g. arsenic pentoxide, 17.2 ml. concentrated sulfuric acid, and 7.2 ml. water is heated to 80° C.; 7.0 g. methyl vinyl ketone is added dropwise to the heated mixture during a period of 15 minutes, the temperature being maintained at 80° C. during the addition and for an hour afterward; the reaction mixture is then cooled, diluted with 300 ml. water, and filtered; the filtrate is neutralized with aqueous ammonia; and the solid formed is filtered off and dried. The product, 4-methyl-5,6-ethylenedioxy-8-nitro-quinoline, weighs about 8 g. (yield about 35%).

Employing the foregoing procedure, the following compounds are obtained when using the indicated corresponding reactants:

4-phenyl-5,6-methylenedioxy 8-nitro-quinoline, from 5-nitro-4-amino-1,2-methylenedioxy-benzene and phenyl-vinyl ketone 4-propyl-5,6-ethylenedioxy-8-nitro-quinoline, from 5-nitro-4-amino-1,2-ethylenedioxy-benzene and propyl vinyl ketone 4-methyl-5,6-methylenedioxy-8-nitro-quinoline, from 5-nitro-4-amino-1,2-methylenedioxy-benzene and methyl vinyl ketone

Example 4

A mixture of 18.2 g. 5-nitro-4-amino-1,2-methylenedioxy-benzene, 28.4 g. arsenic acid, and 100 ml. 85% phosphoric acid is heated to 60° C.; 13.2 g. cinnamaldehyde is added to the mixture dropwise; and the reaction mixture is further treated in the same manner as described for the corresponding (acrolein) reaction mixture in section *f* of Example 1. The product, 2-phenyl-5,6-methylenedioxy-8-nitro-quinoline, weighs about 10 g. (yield about 33%).

Employing the foregoing procedure, the following compounds are obtained when using the indicated corresponding reactants:

2 - methyl - 5,6-ethylenedioxy-8-nitro-quinoline, from 5-nitro-4-amino-1,2-ethylenedioxy-benzene and crotonaldehyde 2 - methyl-5,6-methylenedioxy-8-nitro-quinoline, from 5-nitro-4-amino-1,2-methylenedioxy-benzene and crotonaldehyde 2 - propyl - 3 - ethyl-5,6-ethylenedioxy-8-nitro-quinoline, from 5-nitro-4-amino-1,2-ethylenedioxy-benzene and α-ethyl-β-propyl acrolein On replacing the 5-nitro-4-amino-1,2-methylenedioxy-benzene in section *f* of Example 1 with an equivalent amount of one of the following alkylene-bridged dihydroxy-anilines, the indicated corresponding alkylene-bridged dihydroxy quinoline is obtained [the alkylene-bridged dihydroxy-anilines being obtainable from catechol and the appropriate dibromide (e. g., ethylidene dibromide) by the procedure described in Examples 1 and 2]:

| Substituted Aniline Used | Substituted Quinoline Obtained |
|---|---|
| 5-nitro-4-amino-1,2-ethylidene-dioxy-benzene | 5,6-ethylidenedioxy-8-nitro-quinoline |
| 5-nitro-4-amino-1,2-propylene-dioxy-benzene | 5,6-propylenedioxy-8-nitro-quinoline |
| 5-nitro-4-amino-1,2-(β-diethyl-amino-ethylidenedioxy)-benzene | 5,6-(β-diethylamino-ethylidene-dioxy)-8-nitro-quinoline |
| 5-nitro-4-amino-1,2-(γ-diethyl-amino-α,β-propylene-dioxy)-benzene | 5,6-(γ-diethylamino-α,β-propylene-dioxy)-8-nitro-quinoline |
| 5-nitro-4-amino-1,2-(β,γ-butylene-dioxy)-benzene | 5,6-(β,γ-butylenedioxy)-8-nitro-quinoline |

On replacing the acrolein used in section *f* of Example 1 with an equimolecular amount of one of the following other members of the acrolein-containing group specified hereinbefore, the indicated substituted alkylene-bridged dihydroxy-quinoline is obtained:

| Member of Group Used | Substituted Quinoline Obtained |
|---|---|
| α-methyl-acrolein | 3-methyl-5,6-methylenedioxy-8-nitro-quinoline. |
| α-chloro-acrolein | 3-chloro-5,6-methylenedioxy-8-nitro-quinoline |
| α-phenyl-acrolein | 3-phenyl-5,6-methylenedioxy-8-nitro-quinoline |

Each of the additional nitro, alkylene-bridged dihydroxy-quinolines named hereinbefore may, of course, be reduced to the corresponding amino derivative, and the latter condensed with an alkylamino-alkyl halide, as described in Examples 1 and 2.

Still other alkylene-bridged 5,6-dihydroxy-quinolines of the main general formula may be obtained in accordance with this invention, by selecting the appropriate acrolein-group and substituted-aniline reactants.

The invention may be variously otherwise embodied within the scope of the appended claims.

I claim:

1. A member of the class consisting of: 8-(alkylaminoalkyl-amino)-quinolines having in the 5,6-position the group —O-(divalent alkyl)-O-; and acid-addition salts thereof.

2. An 8-(alkylaminoalkyl-amino)-quinoline having in the 5,6-position the group $$-O-(CH_2)_n-O$$

wherein $n$ represents an integer no greater than 2.

3. An 8-(alkylaminoalkyl-amino)-5,6-methylenedioxy-quinoline.

4. An 8-(alkylaminoalkyl-amino)-5,6-ethylenedioxy-quinoline.

5. A water-soluble acid-addition salt of 5,6-methylenedioxy - 8 - (3 - diethylamino-propylamino)-quinoline.

6. An acid-addition salt of 5,6-ethylenedioxy-8-(5'-isopropylamino-amylamino)-quinoline.

WILLIAM A. LOTT.

No references cited.